(12) United States Patent
Oh (10) Patent No.: US 7,980,601 B2
(45) Date of Patent: Jul. 19, 2011

(54) COUPLER FOR CORRUGATED PIPE

(75) Inventor: Seung-il Oh, Seoul (KR)

(73) Assignee: Kofulso Co., Ltd., Incheon-si (KR)

( * ) Notice: Subject to any disclaimer, the term of this patent is extended or adjusted under 35 U.S.C. 154(b) by 178 days.

(21) Appl. No.: 12/385,129

(22) Filed: Mar. 31, 2009

(65) Prior Publication Data

US 2010/0209178 A1    Aug. 19, 2010

(30) Foreign Application Priority Data

Feb. 16, 2009   (KR) .................. 10-2009-0012549

(51) Int. Cl.
*F16L 19/02* (2006.01)

(52) U.S. Cl. ......... 285/354; 285/382; 285/389; 285/903

(58) Field of Classification Search .......... 285/353–354, 285/382, 382.7, 384–389, 903
See application file for complete search history.

(56) References Cited

U.S. PATENT DOCUMENTS

| | | | |
|---|---|---|---|
| 3,467,413 A | 9/1969 | Madrelle | |
| 3,669,474 A | 6/1972 | Bode | |
| 3,693,664 A | 9/1972 | Schmunk | |
| 3,699,684 A | 10/1972 | Sixt | |
| 3,747,960 A | 7/1973 | Bawa | |
| 3,781,041 A | 12/1973 | Petzetakis | |
| 3,785,682 A | 1/1974 | Schaller et al. | |
| 3,953,057 A | 4/1976 | Petzetakis | |
| 3,958,719 A | 5/1976 | Ward | |
| 4,037,626 A | 7/1977 | Roberts, Jr. | |
| 4,082,327 A | 4/1978 | Sting et al. | |
| 4,141,576 A | 2/1979 | Lupke et al. | |
| 4,149,740 A | 4/1979 | Hall | |
| 4,202,568 A | 5/1980 | Strom | |
| 4,247,136 A | 1/1981 | Fouss et al. | |
| 4,304,415 A | 12/1981 | Wolf et al. | |
| 4,368,894 A | 1/1983 | Parmann | |
| 4,437,691 A | 3/1984 | Laney | |
| 4,443,031 A | 4/1984 | Borsh et al. | |
| 4,542,922 A | 9/1985 | Grossauer | |
| 4,591,193 A | 5/1986 | Oltmanns et al. | |
| 4,606,564 A * | 8/1986 | Kurachi | ................. 285/248 |
| 4,702,502 A | 10/1987 | Shade et al. | |
| 4,779,651 A | 10/1988 | Hegler et al. | |
| 4,801,158 A * | 1/1989 | Gomi | .................. 285/52 |
| 4,875,720 A * | 10/1989 | Sasa et al. | .................. 285/249 |

(Continued)

*Primary Examiner* — James M Hewitt (74) *Attorney, Agent, or Firm* — Jacobson Holman PLLC (57) ABSTRACT

A coupler for a corrugated pipe in which several elements thereof can be handled as a single assembly body, and which can be coupled to the corrugated pipe through a simple process. The coupler includes a coupling base, a guide member, a compression ring, a force-fitting member, a sleeve and a cap nut. A through hole, a compression hole and an insert hole are continuously formed through the coupling base. The guide member is inserted into the insert hole of the coupling base. The compression ring has an opening such that the compression ring is elastically expanded or contracted in diameter. The compression ring is fitted into the insert hole of the coupling base. The force-fitting member is fitted into the insert hole of the coupling base. The sleeve is inserted into the insert hole of the coupling base. A passing hole having a diameter corresponding to the diameter of the peak portion of the corrugated pipe is formed through the sleeve. The cap nut has a threaded hole threaded over the coupling base, and a coupling hole fitted over the protruding part of the sleeve.

4 Claims, 6 Drawing Sheets

U.S. PATENT DOCUMENTS

| | | | |
|---|---|---|---|
| 4,907,830 A * | 3/1990 | Sasa et al. | 285/91 |
| 4,913,473 A | 4/1990 | Bonnema et al. | |
| 5,080,405 A * | 1/1992 | Sasa et al. | 285/315 |
| 5,261,707 A * | 11/1993 | Kotake et al. | 285/308 |
| 5,267,877 A * | 12/1993 | Scannelli et al. | 439/584 |
| 5,292,156 A * | 3/1994 | Sasa et al. | 285/23 |
| 5,423,578 A * | 6/1995 | Kanomata et al. | 285/315 |
| 5,441,312 A * | 8/1995 | Fujiyoshi et al. | 285/23 |
| 5,857,716 A * | 1/1999 | Thomas | 285/143.1 |
| 6,099,046 A * | 8/2000 | Oh | 285/354 |
| 6,378,914 B1 * | 4/2002 | Quaranta | 285/256 |
| 6,435,567 B2 * | 8/2002 | Kikumori et al. | 285/319 |
| 6,502,866 B1 * | 1/2003 | Hujisawa et al. | 285/249 |
| 6,877,781 B2 * | 4/2005 | Edler | 285/354 |
| 7,677,609 B2 * | 3/2010 | Treichel et al. | 285/322 |

* cited by examiner

COUPLER FOR CORRUGATED PIPE

BACKGROUND OF THE INVENTION

1. Field of the Invention

The present invention relates generally to couplers for flexible corrugated pipes having structures in which peak portions and valley portions are repeatedly formed and, more particularly, to a coupler for corrugated pipes which is constructed such that a corrugated pipe can be easily coupled to the coupler only by inserting the corrugated pipe into the coupler and tightening a cap nut over a coupling base.

2. Description of the Related Art

A representative example of conventional couplers for corrugated pipes was proposed in U.S. Pat. No. 4,630,850. This coupler includes a coupling base which has an external thread on the outer surface thereof, a cap nut which is threaded over the external thread of the coupling base, and a sleeve which has a protrusion which is inserted into a corresponding valley portion of a corrugated pipe.

The sleeve has an opening in the outer surface thereof, so that when the corrugated pipe is coupled to the sleeve, the protrusion of the sleeve is expanded in diameter by a peak portion of the corrugated pipe and is then inserted into a corresponding valley portion of the corrugated pipe.

Furthermore, in the conventional technique, an embodiment in which a sleeve comprises a pair of semicircular members was disclosed. The above structure of this embodiment is to achieve the purpose of being able to elastically insert a protrusion of the sleeve into a corresponding valley portion of the corrugated pipe.

In the conventional coupler having the above-mentioned construction, to couple the corrugated pipe to the coupler, the cap nut is separated from the coupling base, and only the cap nut is fitted over the corrugated pipe. Thereafter, the sleeve is coupled to the corrugated pipe and inserted into the cap nut. Subsequently, the cap nut is threaded over the coupling base, thus completing the coupling of the corrugated pipe to the coupler. However, the many processes make the coupling work complex. In addition, because the coupling base, the cap nut, and the sleeve are individually handled, there is the possibility of loss.

SUMMARY OF THE INVENTION

Accordingly, the present invention has been made keeping in mind the above problems occurring in the prior art, and an object of the present invention is to provide a coupler for a corrugated pipe in which several elements thereof can be handled as a single assembly body, and which is constructed such that the corrugated pipe can be coupled to the coupler only by tightening a cap nut over a coupling base after the corrugated pipe is inserted into the coupler which has been assembled into the single body.

In order to accomplish the above object, the present invention provides a coupler for a corrugated pipe, including: a coupling base having an external thread on an outer surface thereof, the coupling base including a through hole having a diameter less than a diameter of a peak portion of a corrugated pipe, a compression hole having a diameter greater than the diameter of the peak portion of the corrugated pipe, and an insert hole having a diameter greater than the diameter of the compression hole, wherein the through hole, the compression hole and the insert hole are continuously formed through the coupling base; a guide member inserted into the insert hole of the coupling base, with an inclined portion on one end of the guide member; a compression ring having an opening at a predetermined position such that the compression ring is elastically expanded or contracted in diameter, the compression ring fitted into the insert hole of the coupling base; a force-fitting member fitted into the insert hole of the coupling base, the force-fitting member having on one end thereof a pressing portion having an outer diameter corresponding to the diameter of the compression hole; a sleeve inserted into the insert hole of the coupling base and including a protruding part extending outwards from a stop portion formed opposite the insert hole, with a passing hole formed through the sleeve, the passing hole having a diameter corresponding to the diameter of the peak portion of the corrugated pipe; and a cap nut having a threaded hole engaging with the external thread of the coupling base, and a coupling hole fitted over the protruding part of the sleeve.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a preferred embodiment of the present invention will be described in detail with reference to the attached drawings.

Figure 1:
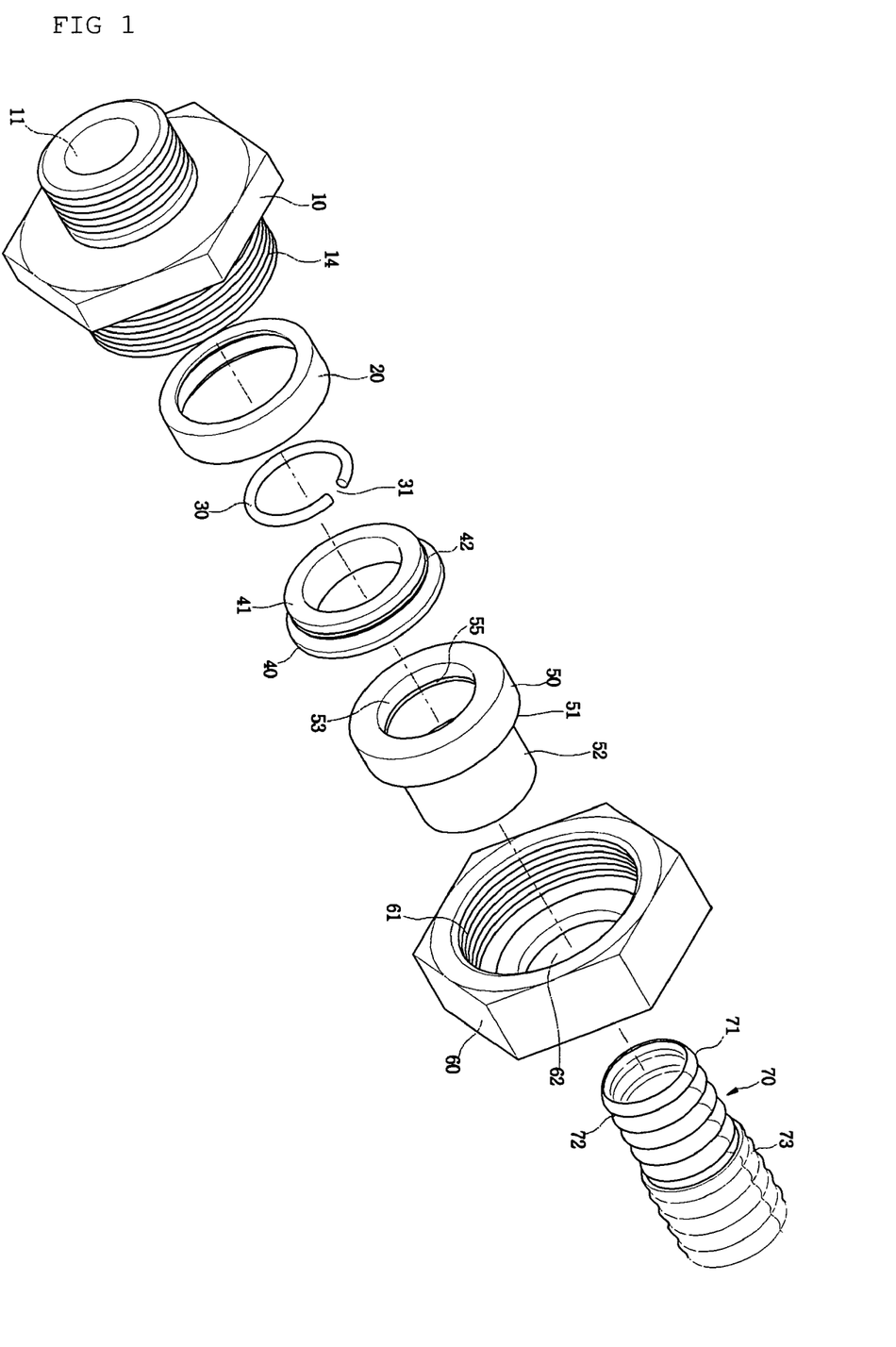
FIG. 1 is an exploded perspective view illustrating a coupler for corrugated pipes, according to an embodiment of the present invention.
Figure 2:
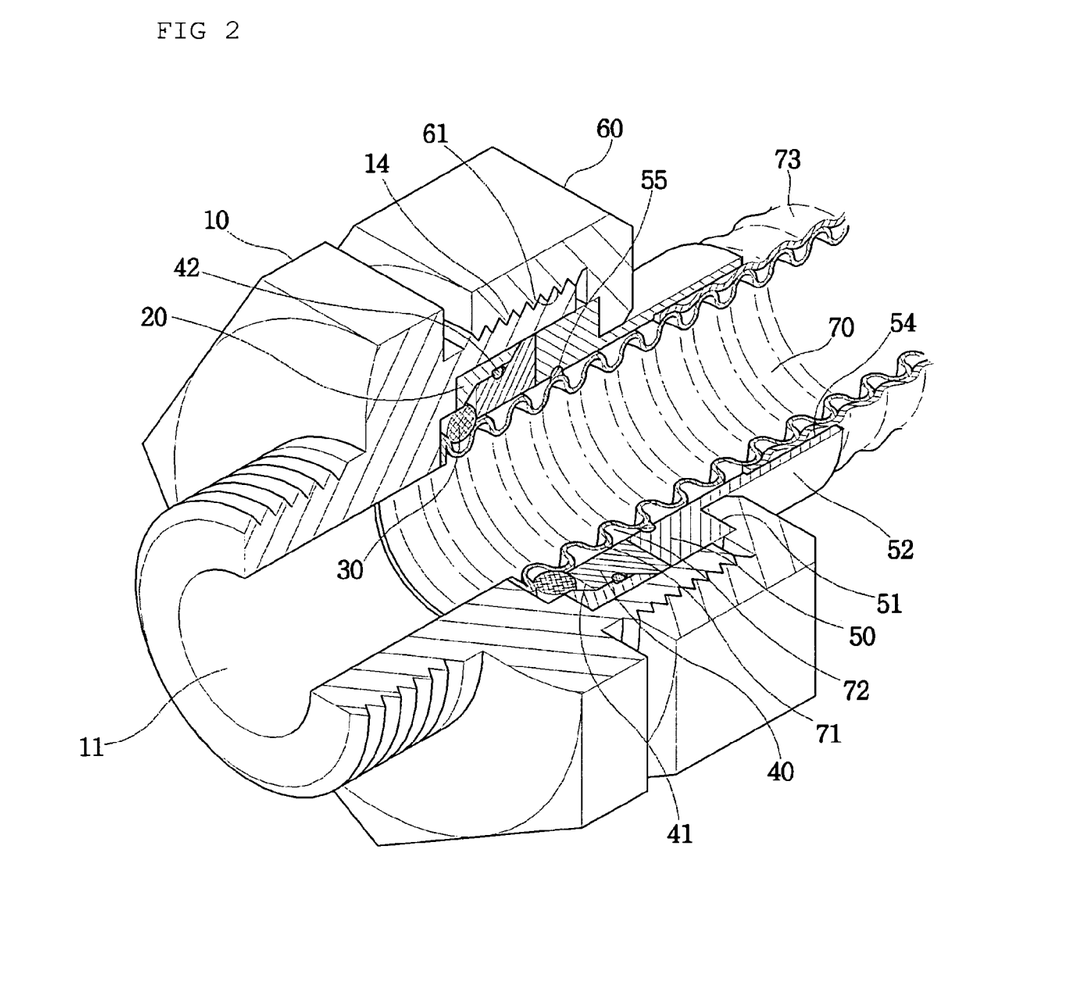
FIG. 2 is a partially broken perspective view showing the coupling of a corrugated pipe to the coupler according to the present invention.
Figure 3:
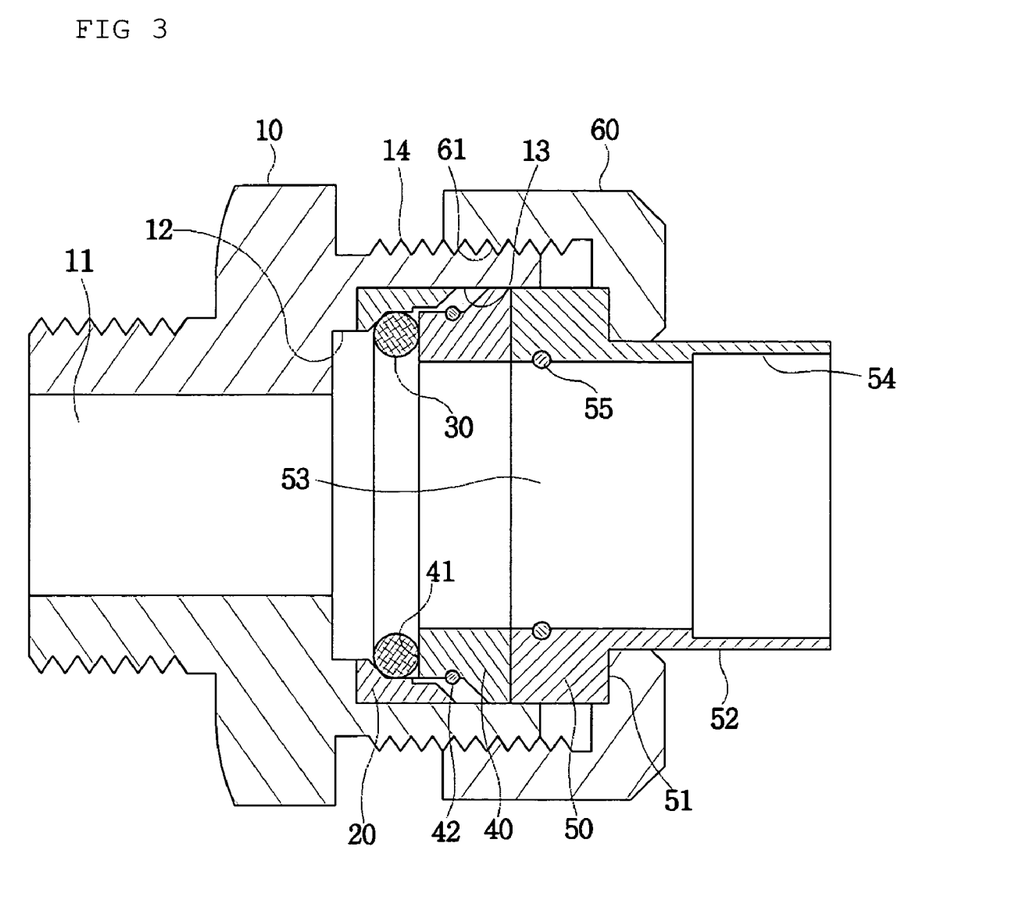
FIG. 3 is a sectional view of the coupler of the present invention.

FIG. 1 is an exploded perspective view illustrating a coupler for corrugated pipes, according to the embodiment of the present invention. FIGS. 2 and 3 are views showing the coupling of the coupler.

As shown in FIGS. 1 through 3, the coupler according to the present invention includes a coupling base 10 which has a threaded coupling structure, a cap nut 60, a guide member 20 which is inserted into the coupling base 10, a compression ring 30, a force-fitting member 40 and a sleeve 50.

A through hole 11 which has a diameter less than that of a peak portion 71 of a corrugated pipe 70, a compression hole 12 which has a diameter greater than that of the peak portion 71 of the corrugated pipe 70, and an insert hole 13 which has a diameter greater than that of the compression hole 12 are continuously formed in the coupling base 10 in the axial direction. An external thread 14 is formed around the circumferential outer surface of the coupling base 10.

The guide member 20 has an inclined portion on one end thereof. The guide member 20 is fitted into the insert hole 13 such that the inclined portion faces the direction in which the corrugated pipe 70 is inserted into the coupler.

In the present invention, the guide member 20 may be integrally formed in the coupling base 10 by forming a part having an inclined portion in the insert hole 13 of the coupling base 10.

The compression ring 30 has an opening 31 at a predetermined position such that it is elastically expanded or contracted in diameter. When the compression ring 30 is fitted into the guide member 20 placed in the insert hole 13, the compression ring 30 moves along the inclined portion of the guide member 20.

The cross-section of the compression ring 30 may have a circular shape or, alternatively, it may have various shapes including triangular, rectangular and pentagonal shapes, as long as the compression ring 30 can appropriately compress the peak portion 71 of the corrugated pipe 70.

The force-fitting member 40 is fitted into the insert hole 13 and has on a corresponding one end thereof a pressing portion 41 which has an outer diameter corresponding to the inner diameter of the compression hole 12.

As shown in the drawings, a packing 42 may be fitted over the circumferential outer surface of the force-fitting member 40.

The sleeve 50 is inserted into the insert hole 13 of the coupling base 10 and includes a protruding part 52 which extends outwards from a stop portion 51 formed opposite the insert hole 13. A passing hole 53 which has a diameter corresponding to the diameter of the peak portion 71 of the corrugated pipe 70 is formed through the sleeve 50.

As shown in the drawings, a seating depression 54 is formed in the passing hole 53 of the sleeve 50 so that a coating shell 73 of the corrugated pipe 70 is seated into the seating depression 54. Thereby, preferably, the corrugated pipe 70 is coupled to the coupler such that a portion of the corrugated pipe 70 from which the coating shell 73 is removed is prevented from being exposed to outside of the coupler. Of course, a packing 55 may be provided in the passing hole 53 of the sleeve 50.

In the present invention, the force-fitting member 40 may be integrated with the sleeve 50.

The cap nut 60 has a threaded hole 61 which engages with the external thread 14 of the coupling base 10, and a coupling hole 62 which is fitted over the protruding part 52 of the sleeve 50. When the cap nut 60 is tightened over the coupling base 10, the pressing portion 41 moves the compressing ring 30 along the inclined portion of the guide member 20, and the opening 31 of the compressing ring 30 becomes closed.

To assemble the coupler of the present invention having the above-mentioned construction, the guide member 20, the compression ring 30, the force-fitting member 40 and the sleeve 50 are sequentially inserted into the insert hole 13 of the coupling base 10. Thereafter, the cap nut 60 is threaded over the coupling base 10 by engaging the external thread 14 of the coupling base 10 with the threaded hole 61 of the cap nut 60 to a degree at which the position of the compression ring 30 is limited by the inclined portion of the guide member 20 and the pressing portion 41 of the force-fitting member 40.

In the assembled coupler of the present invention, because the elements form a structure of a single body, the handling thereof is facilitated.

Figure 4A:
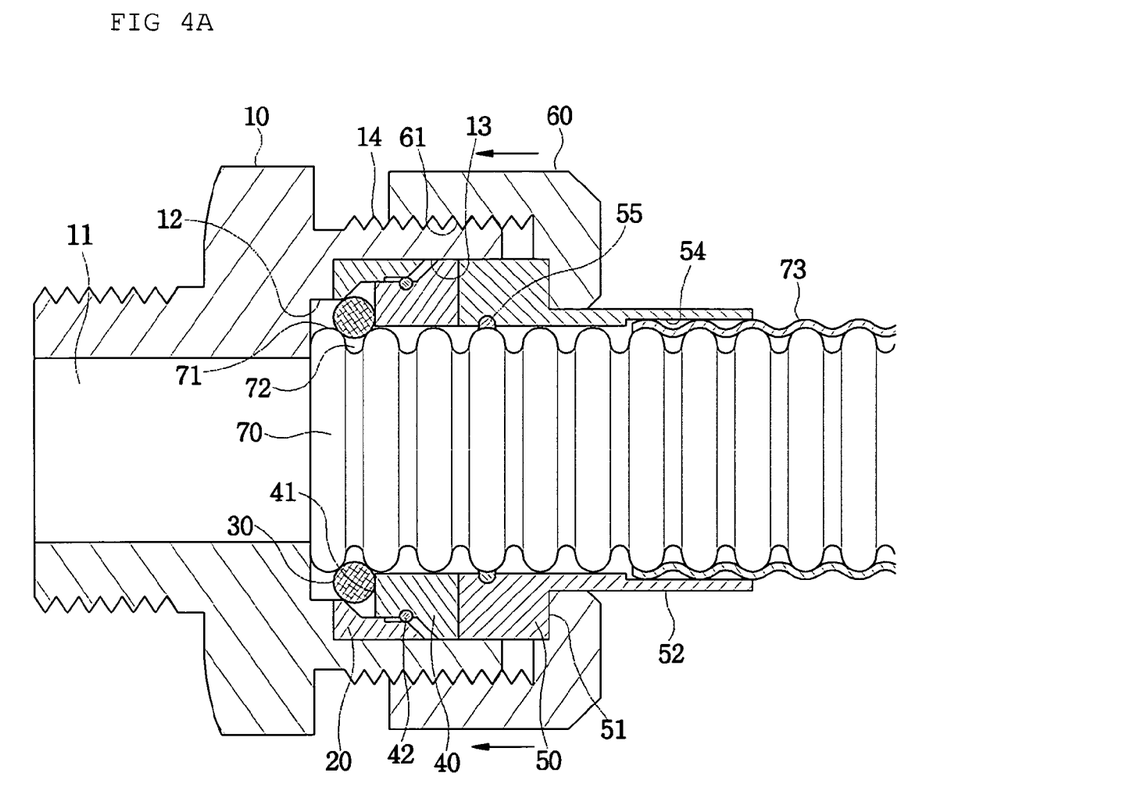
FIGS. 4A through 4C are views showing a process of coupling the corrugated pipe to the coupler.
Figure 4B:
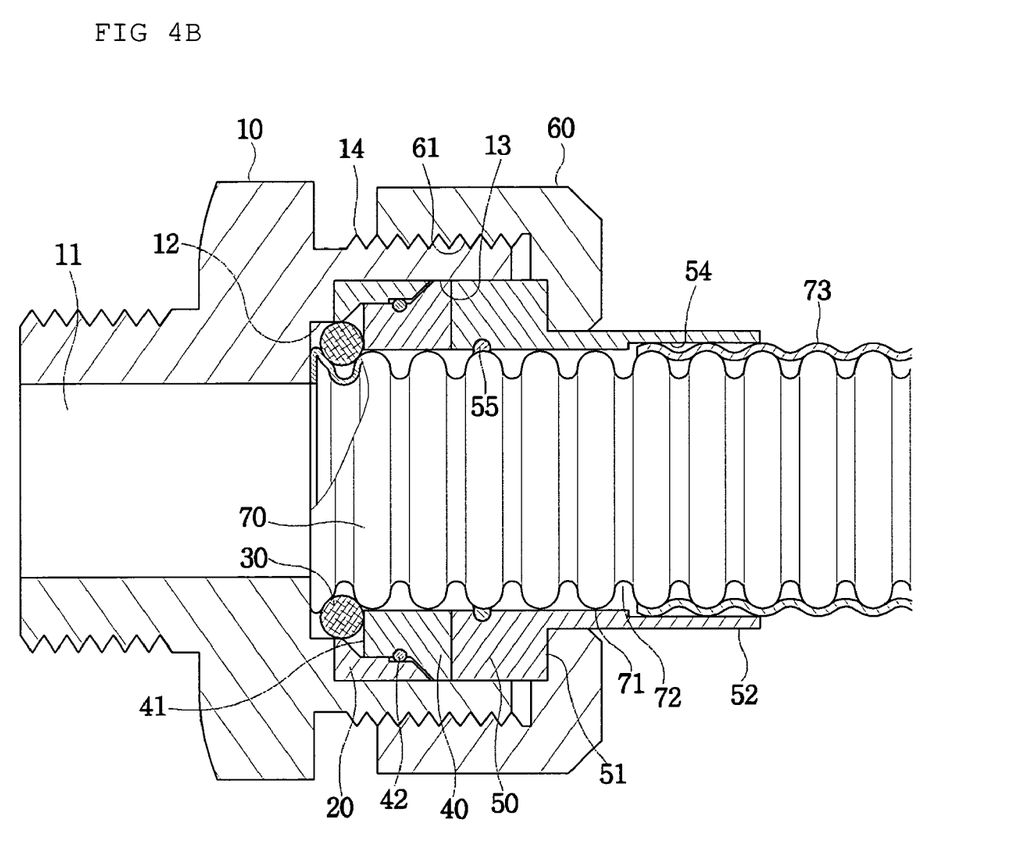
Figure 4C:
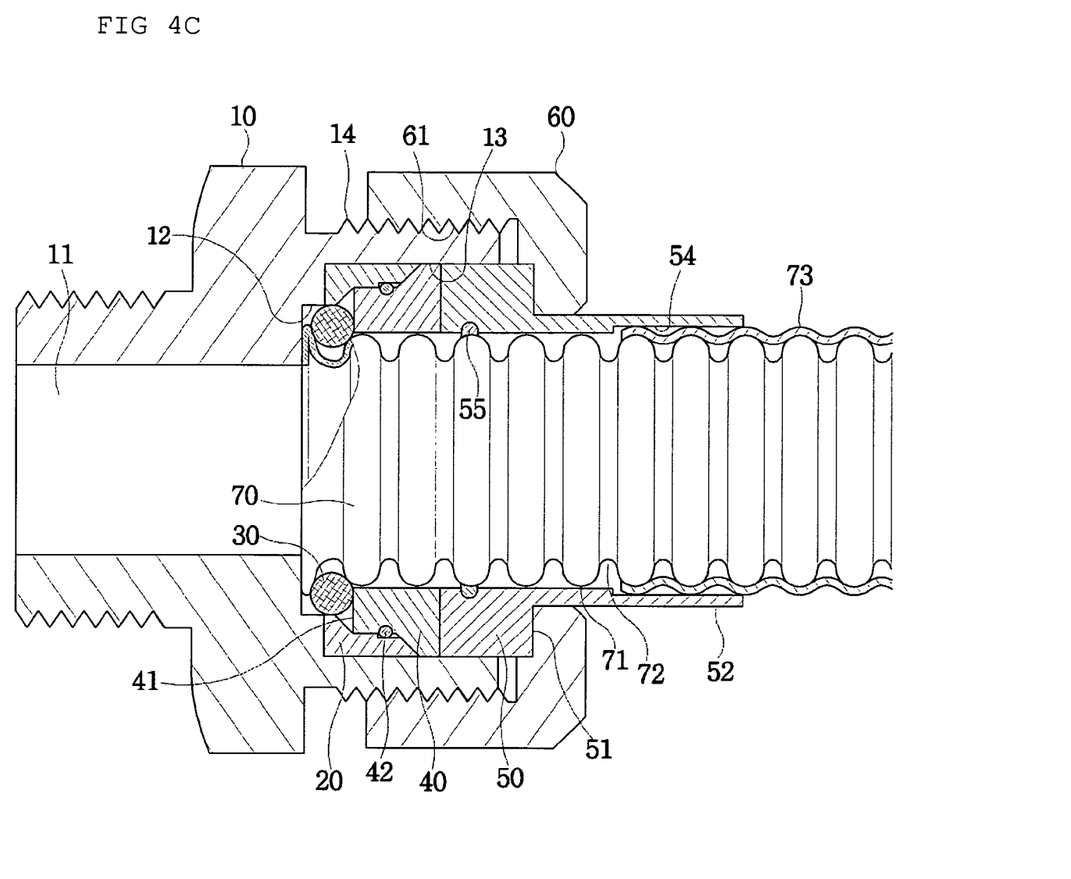

FIGS. 4A through 4C are views showing a process of coupling the corrugated pipe to the coupler of the present invention.

In the above state in which the cap nut 60 is incompletely tightened over the coupling base 10, the corrugated pipe 70 is inserted into the coupling hole 62 of the cap nut 60. Then, because the inner diameter of the through hole 11 of the coupling base 10 is less than the outer diameter of the peak portion 71 of the corrugated pipe 70, the end of the corrugated pipe 70 is disposed at the boundary between the through hole 11 and the compression hole 12 of the coupling base 10 (see, FIG. 4A).

Subsequently, the cap nut 60 is tightened over the coupling base 10. Then, the sleeve 50 pushes the force-fitting member 40, and the pressing portion 41 of the force-fitting member 40 pushes the compression ring 30. Thereby, the compression ring 30 moves along the inclined portion 21 of the guide member 20, and the opening 31 thereof becomes closed.

While the opening 31 becomes closed, the compression ring 30 enters a corresponding valley portion 72 of the corrugated pipe 70. Furthermore, the end of the corrugated pipe 70 is compressed by the tightening force of the cap nut 60, thus completing the process of coupling the corrugated pipe 70 to the coupler (see, FIGS. 4b and 4c).

The end of the corrugated pipe 70 that is compressed by the compression ring 30 forms a structure of sealing the corrugated pipe 70 to prevent the contents from leaking out between the coupler and the corrugated pipe 70. The compression ring 30 which is fitted into the valley portion 71 serves to fasten the corrugated pipe 70 to the coupler.

To separate the corrugated pipe 70 from the coupler, for example, to replace the corrugated pipe 70 with a new one, the cap nut 60 is loosened from the coupling base 10. Thereafter, the corrugated pipe 70 is pulled in the direction opposite the direction in which it was inserted into the coupler. Then, the compression ring 30 is moved from the compression hole 12 to the insert hole 13 and, simultaneously, it is expanded in diameter, thus allowing the removal of the corrugated pipe 70 from the coupler.

As such, in the case of the coupler of the present invention, in the state in which the cap nut 60 was previously coupled to the coupling base 10, the corrugated pipe 70 can be easily coupled to the coupler only by inserting the corrugated pipe 70 into the coupling base 10 and tightening the cap nut 60. Therefore, the present invention is advantageous in that convenience of the pipe coupling is ensured.

As described above, in a coupler for corrugated pipes according to the present invention, in the state in which a cap nut was previously threaded over a coupling base, a corrugated pipe is inserted into a compression hole of the coupling base through a coupling hole of the cap nut. Thereafter, the cap nut is tightened over the coupling base. Then, a compression ring enters a corresponding valley portion of the corrugated pipe and compresses a corresponding corrugated portion of the pipe, thus completing the coupling of the corrugated pipe to the coupler. Therefore, the pipe coupling can be easily conducted. Furthermore, several elements of the coupler can be handled as a single assembly body, thus being more convenient for a user.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A coupler for a corrugated pipe, comprising:
a coupling base having an external thread on an outer surface thereof, the coupling base including a through hole having a diameter less than a diameter of a peak portion of a corrugated pipe, a compression hole having a diameter greater than the diameter of the peak portion of the corrugated pipe, and an insert hole having a diameter greater than the diameter of the compression hole, wherein the through hole, the compression hole and the insert hole are continuously formed through the coupling base;
a guide member inserted into the insert hole of the coupling base, with an inclined portion on one end of the guide member;
a compression ring having an opening at a predetermined position such that the compression ring is elastically expanded or contracted in diameter, the compression ring fitted into the insert hole of the coupling base;

a force-fitting member fitted into the insert hole of the coupling base, the force-fitting member having on one end thereof a pressing portion having an outer diameter corresponding to the diameter of the compression hole;

a sleeve inserted into the insert hole of the coupling base and including a protruding part extending outwards from a stop portion formed opposite the insert hole, with a passing hole formed through the sleeve, the passing hole having a diameter corresponding to the diameter of the peak portion of the corrugated pipe; and a cap nut having: a threaded hole engaging with the external thread of the coupling base; and a coupling hole fitted over the protruding part of the sleeve.

2. The coupler as set forth in claim 1, further comprising:

a first packing fitted over an outer surface of the force-fitting member.

3. The coupler as set forth in claim 1, wherein a seating depression is formed in the passing hole of the sleeve, so that a coating shell of the corrugated pipe is seated into the seating depression.

4. The coupler as set forth in claim 1, further comprising:

a second packing provided in the passing hole of the sleeve.

* * * * *